United States Patent
Sloss (10) Patent No.: US 11,846,733 B2
(45) Date of Patent: Dec. 19, 2023

(54) METHOD OF STABILIZING SONAR IMAGES (71) Applicant: CODA OCTOPUS GROUP INC., Orlando, FL (US)

(72) Inventor: Martyn Sloss, Fife (GB)

(73) Assignee: CODA OCTOPUS GROUP INC., Orlando, FL (US)

( * ) Notice: Subject to any disclaimer, the term of this patent is extended or adjusted under 35 U.S.C. 154(b) by 255 days.

(21) Appl. No.: 14/927,730

(22) Filed: Oct. 30, 2015

(65) Prior Publication Data

US 2020/0400801 A1  Dec. 24, 2020

(51) Int. Cl.
*G01S 7/52* (2006.01)
*G01S 15/89* (2006.01)
*G06T 5/00* (2006.01)
*G06T 5/50* (2006.01)
*G01S 7/62* (2006.01)

(52) U.S. Cl.
CPC .......... *G01S 7/52003* (2013.01); *G01S 15/89* (2013.01); *G06T 5/002* (2013.01); *G06T 5/50* (2013.01); *G01S 7/62* (2013.01); *G01S 7/6245* (2013.01)

(58) Field of Classification Search
None
See application file for complete search history.

(56) References Cited

U.S. PATENT DOCUMENTS

| | | | | | |
|---|---|---|---|---|---|
| 5,155,706 | A | * | 10/1992 | Haley | G01S 15/8902 367/7 |
| 5,383,457 | A | * | 1/1995 | Cohen | G01S 7/52028 73/635 |
| 6,130,641 | A | * | 10/2000 | Kraeutner | G01S 7/52003 367/87 |
| 6,438,071 | B1 | * | 8/2002 | Hansen | G01S 15/89 367/88 |
| 7,259,715 | B1 | * | 8/2007 | Garren | G01S 13/9017 342/25 R |
| 7,456,780 | B1 | * | 11/2008 | Garren | G01S 13/9019 342/194 |
| 7,489,592 | B2 | * | 2/2009 | Hansen | G01S 7/52004 367/12 |

(Continued)

FOREIGN PATENT DOCUMENTS

| | | | | |
|---|---|---|---|---|
| EP | 2956797 B1 | * | 9/2020 | G06K 9/52 |
| WO | WO-2012037157 A2 | * | 3/2012 | G06F 3/016 |

(Continued)

OTHER PUBLICATIONS

Bulow et al., "Underwater stereo data acquisition and 3D registration with a spectral method," Oceans—Bergen, 2013 MTS/IEEE. IEEE, 2013.

(Continued)

*Primary Examiner* — Isam A Alsomiri
*Assistant Examiner* — Vikas Atmakuri
(74) *Attorney, Agent, or Firm* — Barnes & Thornburg LLP (57) ABSTRACT

A method of tracking a known object is presented, wherein a sonar image of an object which is distorted by an artifact associated with sonar imaging is compared with an image generated from a model of the object, and at least one of the two images is modified to reduce differences between them.

14 Claims, 8 Drawing Sheets

(56) References Cited

U.S. PATENT DOCUMENTS

| | | | |
|---|---|---|---|
| 8,213,740 B1* | 7/2012 | Rikoski | G01S 15/8904 |
| | | | 702/14 |
| 8,743,654 B1* | 6/2014 | Sammelmann | G09B 9/56 |
| | | | 367/7 |
| 9,053,571 B2* | 6/2015 | Shotton | G06T 7/251 |
| 2004/0021598 A1* | 2/2004 | Garren | G01S 13/9017 |
| | | | 342/25 R |
| 2006/0034485 A1* | 2/2006 | Negahdaripour | G06T 7/593 |
| | | | 382/103 |
| 2006/0084859 A1* | 4/2006 | Johnson | A61B 5/7257 |
| | | | 600/407 |
| 2006/0287596 A1* | 12/2006 | Johnson | A61B 8/0825 |
| | | | 600/437 |
| 2007/0282200 A1* | 12/2007 | Johnson | G01N 22/00 |
| | | | 600/407 |
| 2008/0043572 A1* | 2/2008 | Hansen | G01S 15/89 |
| | | | 367/11 |
| 2009/0310438 A1* | 12/2009 | Sloss | G01S 15/89 |
| | | | 367/7 |
| 2010/0046327 A1* | 2/2010 | Orlin | G01S 7/539 |
| | | | 367/88 |
| 2010/0076709 A1* | 3/2010 | Hukkeri | G01S 17/87 |
| | | | 356/6 |
| 2010/0141508 A1* | 6/2010 | Nguyen | G01S 13/9089 |
| | | | 342/159 |
| 2011/0110194 A1* | 5/2011 | Sloss | G01S 7/6245 |
| | | | 367/88 |
| 2011/0163912 A1* | 7/2011 | Ranney | G01S 7/414 |
| | | | 342/179 |
| 2013/0202197 A1* | 8/2013 | Reeler | G06T 15/20 |
| | | | 382/154 |
| 2013/0272626 A1* | 10/2013 | Robinson | G06T 5/002 |
| | | | 382/275 |
| 2013/0336583 A1* | 12/2013 | Ernst | G06V 10/751 |
| | | | 382/218 |
| 2014/0064032 A1* | 3/2014 | Sloss | G01S 15/89 |
| | | | 367/88 |
| 2014/0064033 A1* | 3/2014 | Sloss | G01S 15/66 |
| | | | 367/107 |
| 2014/0125671 A1* | 5/2014 | Vorobyov | G06V 20/176 |
| | | | 345/427 |
| 2015/0362595 A1* | 12/2015 | Isaksson | G01C 11/06 |
| | | | 345/419 |
| 2016/0356884 A1* | 12/2016 | Guenther | G01S 15/8925 |
| 2020/0400801 A1* | 12/2020 | Sloss | G06T 5/002 |

FOREIGN PATENT DOCUMENTS

| | | | | |
|---|---|---|---|---|
| WO | WO-2012061945 A1 * | 5/2012 | | G06F 17/30247 |
| WO | WO-2014173393 A1 * | 10/2014 | | G01S 15/025 |

OTHER PUBLICATIONS

Campos et al. "A surface reconstruction method for in-detail underwater 3D optical mapping," The International Journal of Robotics Research 34.1 (2015): 64-89.

Riordan et al., "Implementation and application of a real-time sidescan sonar simulator," Oceans 2005—Europe. vol. 2. IEEE, 2005.

* cited by examiner

Near Accropode (4m)

Far Accropode (12m)

FIG. 8A

Scale →

FIG. 8B

Inflate ↓  →

Difference

METHOD OF STABILIZING SONAR IMAGES

FIELD OF THE INVENTION

The field of the invention is the field of visualization of sparse data from sonar signals scattered from surfaces.

RELATED PATENTS AND APPLICATIONS

The following US Patents and US patent applications are related to the present application: U.S. Pat. No. 6,438,071 issued to Hansen, et al. on Aug. 20, 2002; U.S. Pat. No. 7,466,628 issued to Hansen on Dec. 16, 2008; U.S. Pat. No. 7,489,592 issued Feb. 10, 2009 to Hansen; U.S. Pat. No. 8,059,486 issued to Sloss on Nov. 15, 2011; U.S. Pat. No. 7,898,902 issued to Sloss on Mar. 1, 2011; U.S. Pat. No. 8,854,920 issued to Sloss on Oct. 7, 2014; and U.S. Pat. No. 9,019,795 issued to Sloss on Apr. 28, 2015. US patent applications filed on the same date as the present application, entitled "Object tracking using sonar imaging" by Sloss is also related to the present application.

The above identified patents and patent applications are assigned to the assignee of the present invention and are incorporated herein by reference in their entirety including incorporated material.

OBJECTS OF THE INVENTION

It is an object of the invention to produce an image of an object immersed in a fluid, wherein a portion of the surface of the object which is either not irradiated by the sonar source or not in the field of view of a sonar imaging array is imaged on an image receiving device.

It is an object of the invention to compare the sonar image of an object with an image of a model of the object.

It is an object of the invention to fit a sonar image of an object to an image of a model of the object.

It is an object of the invention to fit an image of a model of an object to a sonar image of the object.

It is an object of the invention to stabilize the fitting an image of a model of the object to the sonar image of an object from ping to ping of a sonar imaging system.

It is an object of the invention to stabilize the fitting an image of a model of the object to the sonar image of an object to from ping to ping of a sonar imaging system when the sonar image of the object is distorted by artifacts of sonar imaging methods.

SUMMARY OF THE INVENTION

An object immersed in a fluid is imaged by directing a sonar pulse at the object and recording sonar signals reflected from the object with a sonar imaging array. The data calculated from the reflected sonar signals is used to produce a sonar image of the object. Artifacts of sonar imaging distort the sonar image. Sonar imaging artifacts arise principally from the low resolution of the sonar imaging device. Other artifacts at a particular voxel of the image arise from neighboring voxels from multipath reflections from the object itself or from other objects in the ensonified volume. Thus, a convex or concave portion of the surface of the object can appear to have a larger or smaller area. The resolution of the system is known, and hence the concave and convex parts of the surface can be enlarged or reduced to produce a more accurate image of the surface. If the object is a known object, a model of the known object recorded in a computer memory is fit more easily, faster, and more accurately to the sonar data than fitting the sonar data to the model data. Either the model data or the sonar data are changed to take the distortions in the sonar image into account when fitting the model and sonar data.

BRIEF DESCRIPTION OF THE DRAWINGS

FIGS. 8 A-D show sketches of a barbell changed by scaling and by inflation.

FIGS. 9 A-D show sketches of shapes changed by inflation based on face normals and surface normals.

FIGS. 10 A-F shows results of scaling and inflation Accropode model images.

DETAILED DESCRIPTION OF THE INVENTION

It has long been known that data presented in visual form is much better understood by humans than data presented in the form of tables, charts, text, etc. However, even data presented visually as bar graphs, line graphs, maps, or topographic maps requires experience and training to interpret them. Humans can, however, immediately recognize and understand patterns in visual images which would be impossible for even the best and fastest computers to pick out. Much effort has thus been spent in turning data into images.

In particular, images which are generated from data which are not related to light are difficult to produce. One such type of data is sonar data, wherein a sonar signal is sent out from a generator into a volume of fluid, and the reflected sound energy from objects in the ensonified volume is recorded one or more detector elements. The term "ensonified volume" is known to one of skill in the art and is defined herein as being a volume of fluid through which sound waves are directed.

The sonar data from multielement detectors is generally recorded as points in three dimensional space as a function of range and of two orthogonal angles. These data in polar coordinate space are in turn generally reduced and presented as data from a three dimensional Cartesian coordinate space. The data may then be presented as height above the sea bed, for example, or depth below the surface, as a "z" coordinate, while the x and y coordinates could be chosen as west and north, for example. In other examples, the x or y coordinate could be chosen to be parallel to a wall or other long, mostly straight object.

One characteristic of sonar data is that it is very sparse, as the ensonified volume is generally water having only one or a few objects of interest. The volume of the fluid is generally divided into a series of cubes, and data is returned from a small percentage of the cubes. The resolution of the sonar is proportional to the linear dimension of the cubes, while the computation cost of recording the signal from each detector element and calculating from whence the signals have come is inversely proportional to the cube dimensions to the third power. There is then a tradeoff between resolution and computer power and time taken to produce an image from received data.

In other electromagnetic or ultra sound imaging technologies, the data are very dense. In an art unrelated to sonar imaging, medical imaging essentially has signals from each voxel, and the techniques for such imaging as CT scans, MRI scans, PET scans, and Ultrasound Imaging is not applicable to the sparse sonar data. In the same way, signals from sound waves sent out from the earths surface into the depths to return data of rock formations in the search for oil produce dense data, and techniques developed for such fields would not in general be known or used by one of skill in the art of sonar imaging.

The present invention is used to treat the sparse data from sonar imaging equipment to produce images which would be comparable to an optical image of an object in a sound wave transmitting medium if the object could in fact be seen through turbid water or other fluid or gas. These images are used to track and precisely place objects Optical inspection of objects in a fluid is often not possible because of smoke and fog in air, for example, or turbidity in water or other fluid. Sonar imaging of such objects is often used. However, if objects are to be placed, grasped, or moved in the fluid, a typical sonar image taken from a single point of view is not sufficient. The "backside" of the object is not viewable, nor is the background of the object in the "sonar shadow" viewable.

Figure 1:
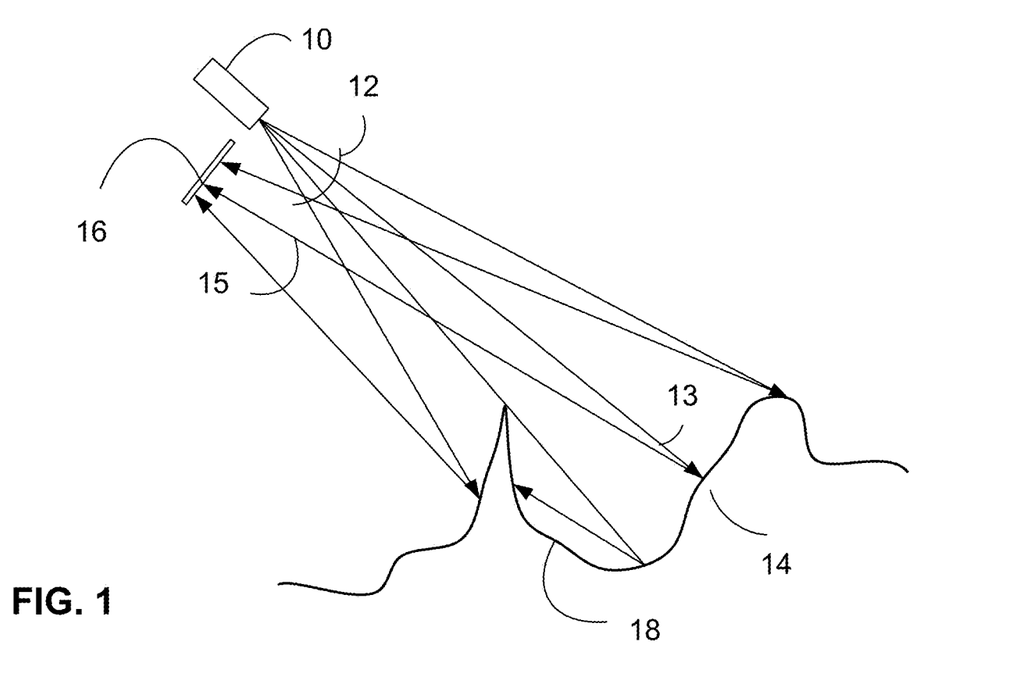
FIG. 1 shows a sketch of a sonar source sending sonar wave to a surface and a sonar array receiving device receiving reflected sonar signals from the surface.
Figure 2A:
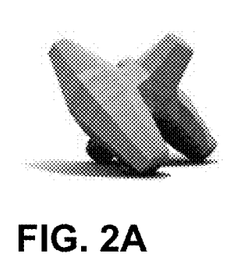
FIGS. 2A-2D show images of different cast blocks used for breakwaters.
Figure 2B:
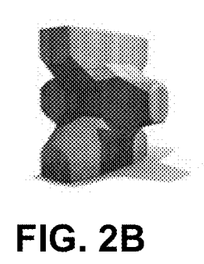
Figure 2C:
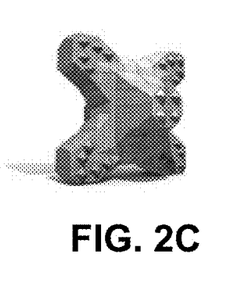
Figure 2D:
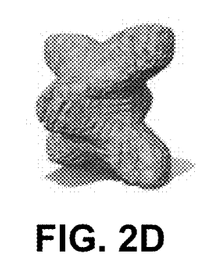

FIG. 1 shows a typical sonar imaging set up, where a source 10 projects an outgoing sound wave noted as a wave front 12. The sound wave can be traced as a ray 13 which strikes a sonar reflecting surface 14 and is reflected as ray 15 to a sonar imaging array 16. If an object, or part of the background, stops the sound waves from striking a region 18, the no data is collected from the region and so it is not imaged and is said to be in a "sonar shadow". A sonar imaging array, such as an Echoscope® from CodaOctopus Inc., comprises an array of microphones which send electrical signals representing the received sound waves to electronics and a computer system for analysis. The sonar signal 12 will be a "ping" of duration milliseconds to microseconds. A typical sonar ping will be, say, 70 microseconds in duration and have a frequency of 300-1000 KHz. Each microphone of the array receives a many reflected sonar signals of the frequency of the sound wave sent out from the source, but with differing phases which add coherently to produce a signal. The reflected sonar signals from parts of an object nearer to the imaging array will arrive sooner that a signal from objects in the background, and a filter, for example a time window, can be used to sort out the signals from the different parts of the object and background.

The reflected sonar signals are digitally sampled at a rate higher than the frequency of the sound wave, and the amplitude and phase of the signals are recorded. The device works very much like an interferometric imaging device where light from an object is imaged on a plane, and where the intensity and phase of the light are measured simultaneously. From the measured sonar signals, the range of the various parts of the object from the imaging array can be calculated and the intensity and phase of the sound waves are recorded, for example, in a computer accessible data storage device for further manipulation. From the recorded data, and image can be created and viewed, for example, on a computer monitor, where the image is shown with the "height" of the different parts of the image shown as differing colors. We define this type of image herein as a three dimensional (3D) image. Another type of image would be an image where the surfaces are shaded to give the impression of light and shade which also can be interpreted by a human observer as a 3D image. Another type of 3D image is an image which appears to shift as the viewpoint is shifted, which serves very well to show up the range differences by parallax. Another type of 3D image is the familiar topographic map image, where the regions of equal height are connected with lines. All images where a third dimension can be read on a two dimensional image display are anticipated by the inventor.

As with optical holograms, images may be produced as would be seen from differing viewpoints. The inventor anticipates that a binocular image could be produced for display on a 3 dimensional display device for projecting the image to two eyes of a human observer.

When building a breakwater, the top (armor) layer is usually made with large heavy concrete blocks. These blocks must be placed sufficiently densely so as to minimize gaps between them to stop the egress of the underlying layers, and must be sufficiently heavy so as not to be moved by the action of waves and tides. Traditionally two layers of boulders, or in most cases cubic concrete blocks have been used. In order to reduce the amount of material required a new approach was introduced, where complex geometric volumes with overlapping parts were chosen. This allows only one layer of armor to be used while still meeting the minimum gap requirement. Photographs of typical blocks are shown in FIGS. 2A-2D. These blocks are generally made from concrete cast in steel molds, and may be several meters high and weigh many tons. The advantage of the Echoscope® data is that as it is three dimensional (3D), the virtual eye-point can be moved when displaying the data to give the user a better overview of the scene.

Figure 3:
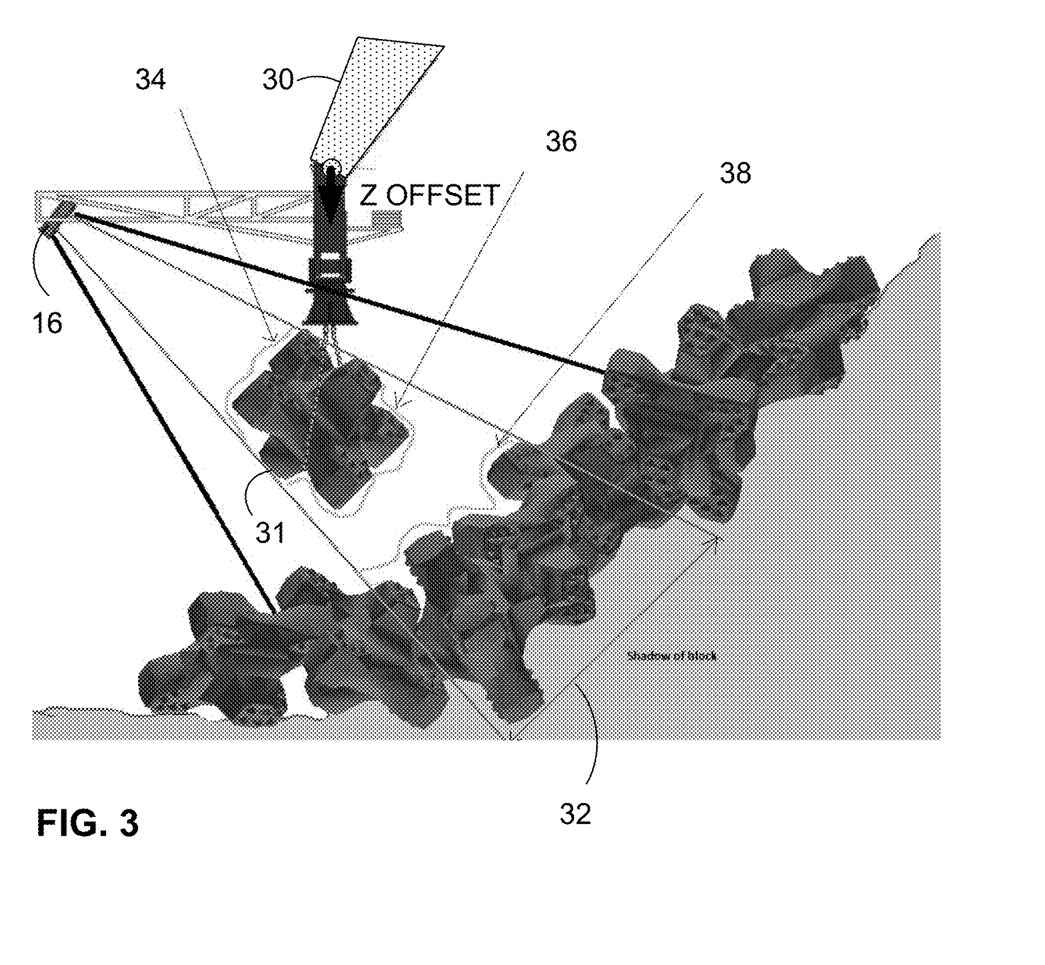
FIG. 3 shows a sketch of an excavator arm carrying a suspended block for placement in a breakwater.
Figure 4A:
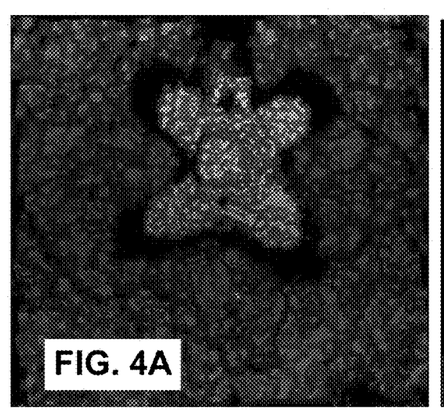
FIG. 4A shows a sonar image of a block casting a shadow against a background.

FIG. 3 shows a sketch of an excavator arm 30 carrying a suspended block 31 for placement in a breakwater. The angular portion 32 of the ensonified region of the background behind the block 31 is called a "sonar shadow", and the portion of the background 38 does not receive sound waves and is "invisible" to the detector 16. This effect is shown in the sonar image shown in FIG. 4A where the background immediately behind the block is shaded.

Figure 4B:
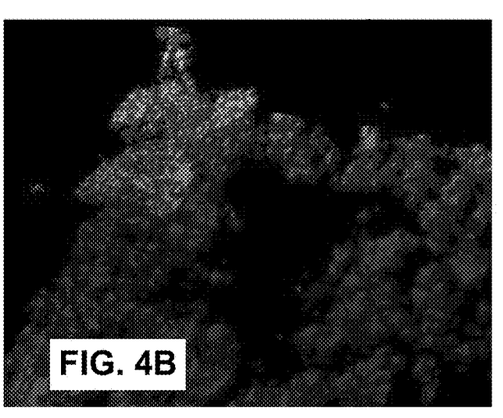
FIG. 4B shows a sonar image of the data of FIG. 4A shown from a different viewpoint.

One advantage of the 3D visualization made possible by the 3D sonar detector is that the view point of the images drawn may be moved to take advantage of the human recognition of parallax to give the $3^{rd}$ dimensional image information. As the Echoscope® itself is fixed with respect to the scene, this virtual movement makes the shadowing effect more apparent. When the image shown from a viewpoint apart from the sonar array 16 as in FIG. 4B, the points corresponding to the backside of the block are missing and the block appears truncated.

Figure 4C:
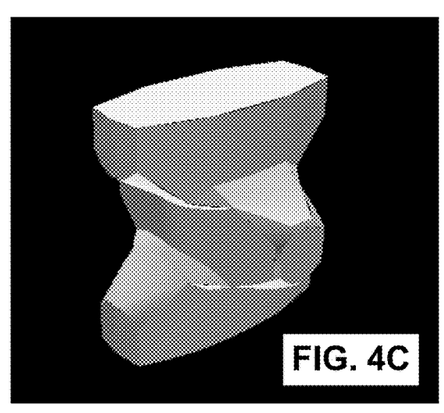
FIG. 4C shows a non-sonar image of a model block.
Figure 4D:
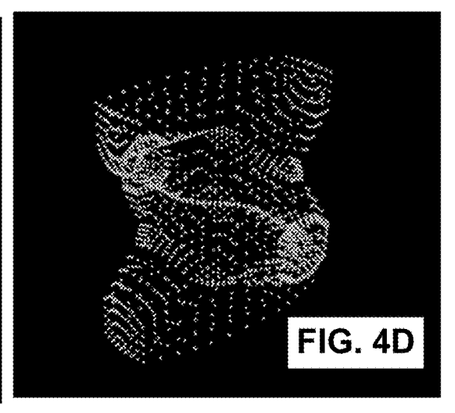
FIG. 4D shows a set of points on the surface of the model of FIG. 4C.

In order to show the backside of the block as the eyepoint is moved around, we obtain the sonar data on the relative coordinates of the surface of the block, and construct a model of the block in the computer as in FIG. 4C. The coordinates of the model are best taken from the machine drawings of the mold for the block, but any measurement of the surface of the block may be used. The data may be stored as a set of x, y, z coordinates detailing the entire surface of the block, or a subset of the data may be stored if there are symmetries like reflection in a plane or rotation about an axis. In general, more of the surface must be measured than can be viewed from a single viewpoint by the sonar system. Generally, the entire surface of the block is measured. The center of mass of the block is determined by calculation from the measured surface, or by measurement. In order to track and align the model with the sonar image data, a set of points such as sketched in FIG. 4D are created based on the vertices and faces of the 3D model. These points are then aligned with the sonar data points using a recognized image matching technique such as 'Iterated Closest Point' (ICP).

Figure 4E:
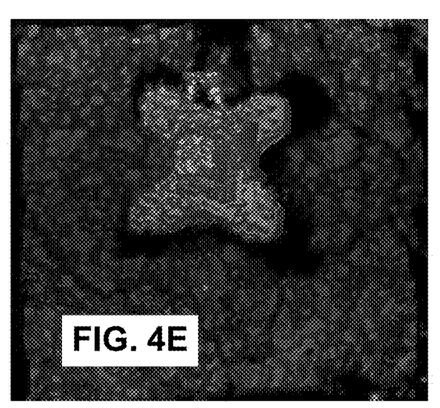
FIG. 4E shows the image of FIG. 4A combined with an image of a model of the block wherein the set of points of FIG. 4D have been fit to points measured from the data of FIG. 4A to give the orientation of the model of FIG. 4C.
Figure 4F:
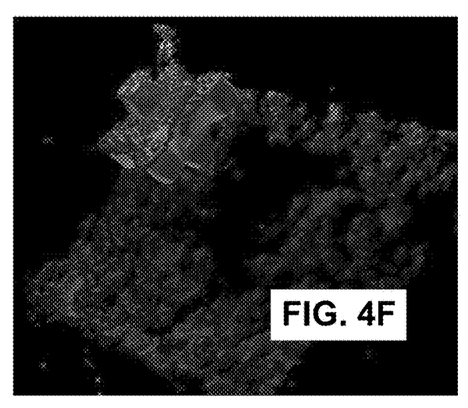
FIG. 4F shows the combined image of FIG. 4E taken from the viewpoint of FIG. 4B.

The model data image has now the same rotational orientation as the object, and appears to be the same distance away from the detector. FIG. 4E shows the data of FIG. 4A overlaid on to an image of the model aligned with the sonar data. FIG. 4F shows data from the viewpoint of FIG. 4B where the model image is drawn in to replace the missing sonar data.

Many other methods of finding the best fit between sets of points in three dimensions could be used.

Figure 5A:
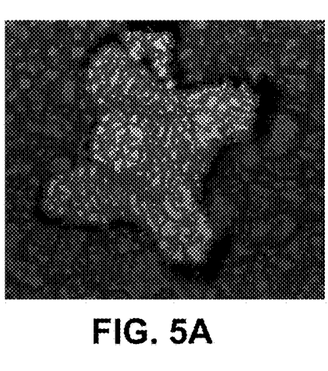
FIGS. 5A-5F show sonar images of a block and images chosen from a model of the block in the steps of finding orientation of the model which will be the same as the orientation of the block.
Figure 5B:
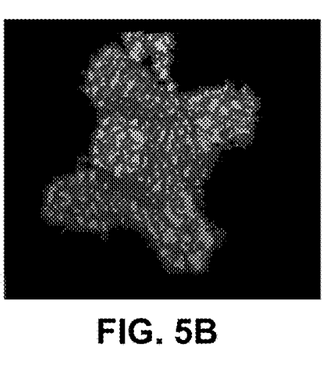
Figure 5C:
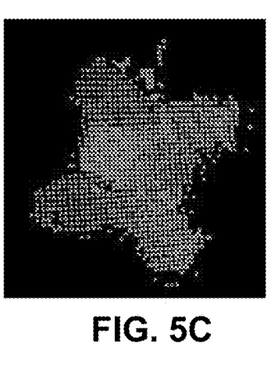

The ICP algorithm and other point matching algorithms require a time proportional to the number n of points in the first set of points to be matched times the number m of points in the second set of points. This time proportional to n×m may be reduced to n log m by reducing the set of points from the model to just those points which could be seen from an Echoscope®. FIG. 5A shows the Echoscope® data with the data from the background. FIG. 5B shows the data of FIG. 5A where the background has been set to zero. FIG. 5C is the sonar data of FIG. 5B reduced to a set of coordinate points.

Figure 5D:
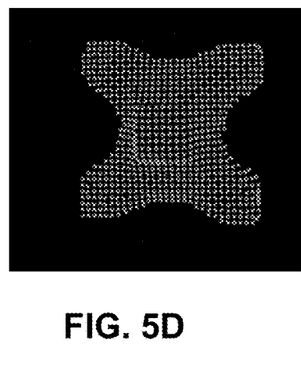
Figure 5E:
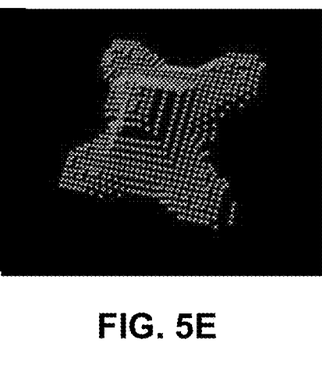
Figure 5F:
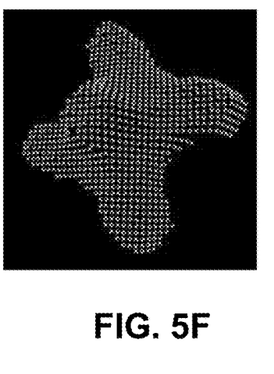

FIG. 5D shows one of a small (<20) set of points representing a part of the surface of the block, which are iteratively matched to the points of FIG. 5C to find the tilt and rotation needed to bring the model into matching position FIG. 5E with the block. FIG. 5E shows the rotated and tilted points used in FIG. 5D. Note that some points in FIG. 5D would not be seen, and can be removed to give a set of points as in FIG. 5F. Once the orientation of the block has been roughly calculated, some points may be removed as they would become invisible as the block rotates, and other points that would come into view are added, to further match the model orientation with the sonar data from the object as in FIG. 5F. This process is repeated with each of the small set of points, and the best match chosen to give the best orientation of the model to the block Now, the orientated model image is added to the sonar data to provide views of the backside of the object as in FIG. 4F. Alternatively, only the calculated model image of the correctly placed and oriented is shown to the operator. The total time taken to match the model points to the sonar points is much less when matching each of the small set of points and using the best match than using all the data points from the model.

Figure 6A:
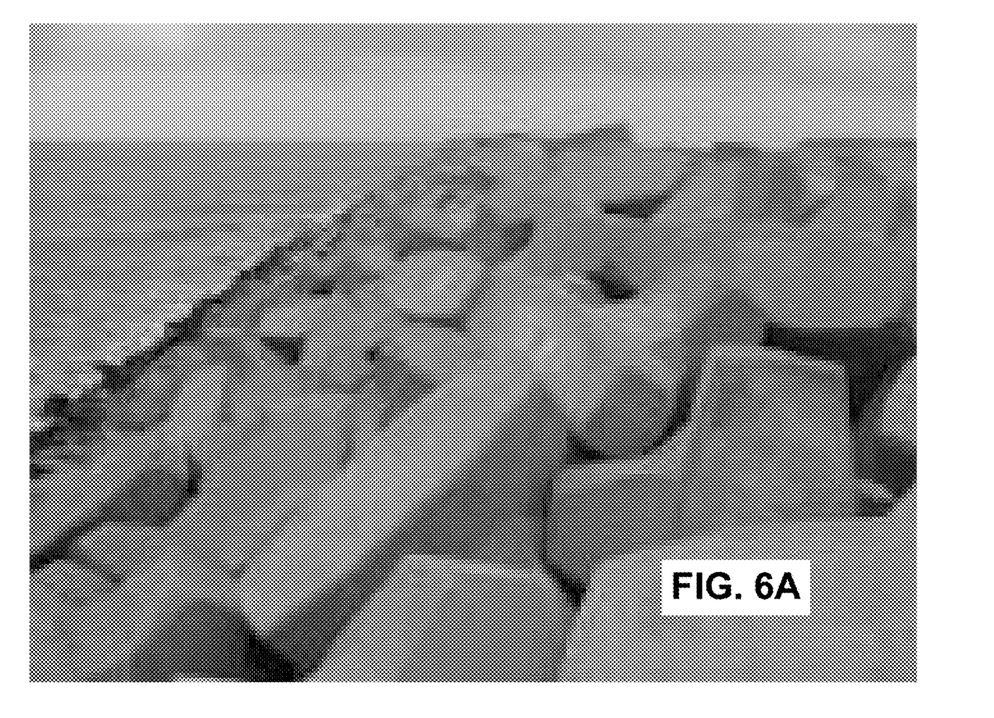
FIGS. 6A and 6B shows show photographs of portions of breakwaters above water level.
Figure 6B:
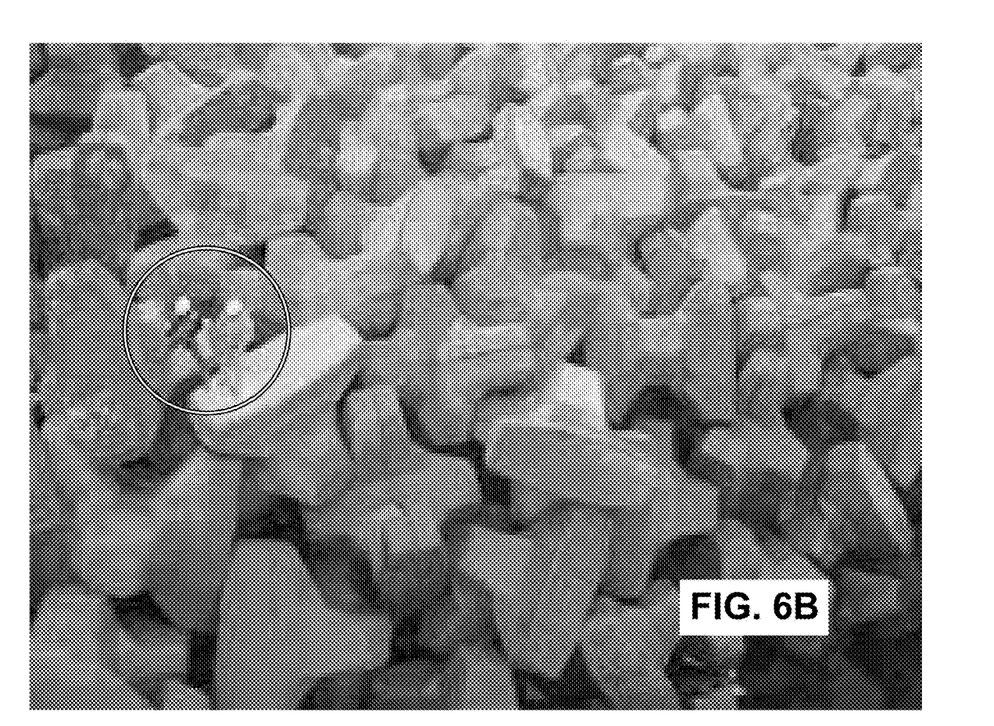

FIGS. 6A and 6B shows show photographs of portions of breakwaters above water level.

Before the first block in a set of blocks is laid, a sonar image of the background is recorded. The position and orientation of the sonar source and sonar imaging device are recorded, so that the "background" of the sonar shadow recalled from the recording, and can be filled in as the block is moved into place. The orientation of the block is known after it is placed, and the "image" of the block can be added to the background. As the blocks are placed, the position, orientation, etc. of each block is recorded so that the entire background may be matched. The measurement of the exact positions of the background blocks and the exact position of the equipment supporting the block being placed is at times not accurate enough to ensure correct placement of the blocks from positional data alone, and it is often preferable that the sonar background objects be measured as the block is being moved into position. As the block is being swung into place, the background is measured in the field of view "int front of" the swinging block. This background image is used by itself, or fit to a previously recorded background.

The block is moved into position to place it in a location and orientation with respect to the other blocks. The location and orientation must satisfy a criterion. One such criterion is that each block is supported by contact of at least three contact points with other blocks.

As the block is being moved and rotated, the movement and rotation is slow compared to the rate at which sonar images are recorded. The velocity and rotation of the block is measured by measuring the location of the excavator arm and the distance from the excavator arm to the block, and measuring the rotation of the block from ping to ping. The position and rotational velocity of the block is predicted at the time of the next ping, and and the previous set of points for matching model to sonar image is adjusted take into account the new position and rotation angle, so the iterative process of matching takes much less time, which allows us to track the block more accurately. For example, we anticipate that a set of points along one edge of the block can disappear from the sonar image, while another set of points on the opposite edge swings into view.

In viewing the block and background in the sonar image, the background can also be enhanced by using previously recorded orientations and positions to "draw in" the previously placed blocks. The sonar data is then much easier to understand, especially when the eyepoint is rotated back and forth to give enhanced 3D visualization. The previously recorded background orientations and positions may be augmented or replaced by images collected in as the blocks move into place.

A number of artifacts combine to produce sonar images which are quite distorted. When models are used to produce additional data for the sonar imaging visualization, the position and orientation of the model must be fit to the sonar data. Artifacts which distort the sonar image then affect the program which tries to match the sonar data points to the model data points, and different orientations of the model image with respect to the sonar image may give a fit to within the criterion chosen to end the iterative process. In particular, orientations chosen for each ping differ enough that the model image appears to jitter, even when the object is stationary.

Image artifacts arise, for example, due to the resolution of the sonar system. If the resolution of the system changes because the distance between the object and the Echoscope® changes, the protrubences on an Accropode (a large concrete object used in underwater breakwaters to armor rip rap) may appear to be thicker than they should be because the diameter is measured at "high resolution" would have an uncertainty of a resolution element of 10 cm, and at low resolution of 30 cm.

Objects can appear smaller as at some angles the reflected energy is below the detection threshold. Consider a sphere.

The surface normal of the center (surface) points directly at the sonar source and receiver, so reflects directly back at high intensity, which measurement is set to unity. The surface normal half way out to the edge of the sphere is indicates that 70% of the energy reflects back, while 30% is scattered more than 90 degrees to the incoming beam. The surface normal of the edge (surface) forms an angle of 90 degrees to the direction of the sonar beam, so reflects no energy directly back from that point. Setting the threshold for detection to 80% will show a sphere less than half the true size (even accounting for inflation). Another artifact of sonar imaging is sidelobe illumination. Every beam has 4 neighbors with a lower intensity, and so some energy from neighboring points of the surface will arrive at the detector and appear to come from another point. The beams can combine to show a surface where there is indeed a hole. Random data from other sound sources is an artifact which is very difficult to deal with if it is truly random, or even if it is not understood. Local Reflection/MultiPath effects is where a point on the object reflects sound onto another part of the object, which further reflects to the detector, and which causes points to appear in the wrong place.

The further away objects are, the less accurately we can track them. An Echoscope® produces comparatively low resolution images compared to Images generated by light. A standard frequency (375 KHz) Echoscope® has a resolution of 48×48 elements (~50 Degrees by 50 Degrees), giving an approximate angular resolution of 1 degree. However due to the way the image is constructed, we also have a limiting factor based on the physical size of the array (~20 cm×20 cm). This is known as 'Aperture' size. The range above the point where 1 degree is greater than 20 cm is known as 'Far Field'. The range below the point where 1 degree is less than 20 cm is known as 'Near Field'. So the resolution of the standard frequency Echoscope® is either 1 degree or 20 cm, whichever is greater.

(In 'Near Field' you can make the aperture smaller by only using, say, 24×24 elements. This gives a resolution of 2 degrees or 10 cm, whichever is greater. Limiting the number of elements to a 12 by 12 element array gives 5 cm resolution, etc.)

For 48×48 resolution elements, or one degree resolution, the standard frequency Echoscope® Far Field starts at around 11.5 m.

Figure 7A:
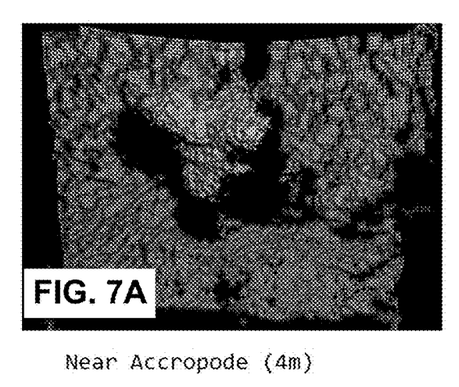
FIGS. 7A and 7B show near field sonar images of Accropodes having different resolution.
Figure 7B:
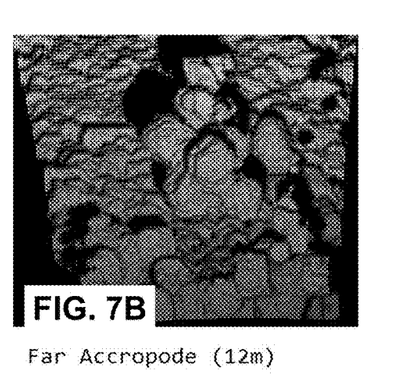
Figure 8A:
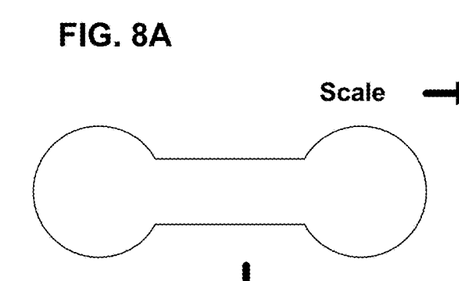
Figure 8B:
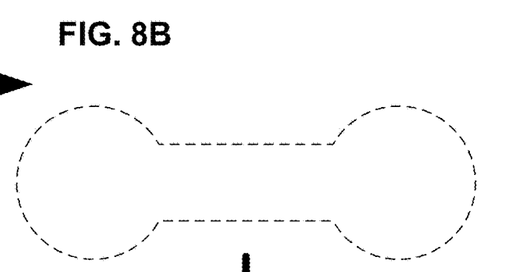
Figure 8C:
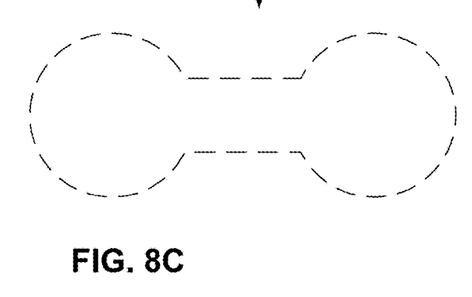
Figure 8D:
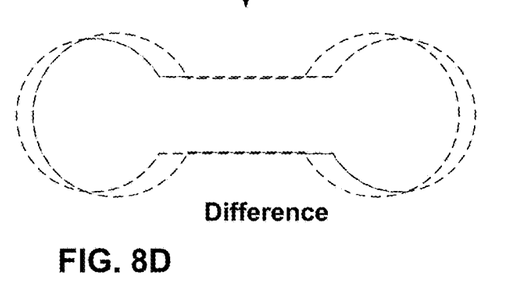

FIGS. 7A and 7B show how resolution changes an image.

The Accropode® Image in FIG. 7A was captured by a Standard frequency Echoscope® and is of a 5 cubic Meter Block (2.58 m high) at a range of 4 m, giving us an effective near field resolution of ~12 cm which works out to 21 beam widths across the Accropode height. (Note: there is also a Range resolution. The block resolution that is due to the generation of images as slices of data, It is dependent on Sonar pulse length and how often we generate range slices. For an Echoscope® it is usually less than 10 cm, so the aperture range resolution is the a dominant factor.)

The Accropode Image in FIG. 7B was captured by a High frequency Echoscope® which uses 610 KHz sound waves. Increasing the sound frequency changes the beam width, resolution, near to far field transition distance, etc. The near to far field transition is at 19 m, FIG. 7B is an image of a 2cubic Meter Block (which is 1.9 m high) at a range of 12 m, giving us an effective near field resolution of ~16 cm. The block appears to be 12 beam widths high and the resolution is 8% of the block height The blocks appear approximately the same size in images 7A and B. However the protrubences on the image in FIG. 7B appear to be fatter (not larger) than in 7A because of the lower resolution.

If we place Accropode model data over the Accropode sonar image in FIG. 7B, we can easily see how its size does not match up well in all dimensions. The protrubences of the model Accropode fit loosely inside the data of the protrubences of the sonar image in FIG. 7B, and when the program tries to match the images from ping to ping, the "best fit" to the sonar image data shifts a lot from ping to ping, and the model image appears to jiggle with small and random motions.

The Accropode in FIG. 7A appears less fat as its beam resolution is 4.6% of the block size. The Accropode in FIG. 7B appears fatter as its beam resolution is 8.4% of the block size.

A novel method for reducing this visual jittering effect has been implemented.

Since the cause of the distortion in the sonar image is known, we can preferably reverse the distortion of the sonar image. More preferably, we can distort the model image in a way which matches the distortion of the sonar image since we have more and more accurate data about the model than we do sonar data.

Preferable ways to match the distortion are dilation of the model image or erosion of the sonar image.

If we were to break the volume of interest into a volume of (say 1 cm cubes (voxels)), we can place the model inside this volume, if a 1 cm cube is predominantly inside the volume of the model we set that cube to be 1, otherwise it is 0. We can then inflate the model (by 1 cm), by looking at each cube, and its neighbors (the cubes that share any of its faces (there are 6 of these), or share any of its vertices (there are 26 of these)). If any of its neighbors have the value of 1, then set the value of this cube to 1. Every time we repeat this process the volume inflates by one voxel. Similarly if we wanted to make the data object smaller we could do some by Erosion. If we were to break the volume of interest into a volume of (say 1 cm cubes (voxels)), we can place the model inside this volume, if a 1 cm cube is predominantly inside the volume of the model we set that cube to be 1, otherwise it is 0. We can then deflate the model (by 1 cm), by looking at each cube, and its neighbors (the cubes that share any of its faces (there are 6 of these), or share any of its vertices (there are 26 of these)). If the voxel has a value of one and the number of its neighbors is less than or equal to some value (say one if we are looking at face neighbors), then we set that's voxel value to zero (removing it from the volume). Every time we repeat this process the volume deflates by one voxel.

Inflation, deflation, or scaling of the data takes less computer time than dilation or erosion, and is more preferable with limited computer equipment. Scaling of the model or sonar image data is one preferred embodiment of the invention. More preferably, inflation of the model data or deflation of the sonar data changes the fitting of the model to the sonar data better than scaling the data. The most preferable embodiment of the data is to inflate the model data to better fit the sonar data.

For simple (convex) objects, such as cubes and spheres, inflation and scaling are the same. However, this is not the case for more complex non-convex objects. FIGS. 8A-D compares images of a 'Barbell' that has been both inflated and scaled. When scaled, the image uniformly increases in size. However, when inflated, both bells get larger, but their centers remain the same, and the bar gets both shorter and thicker, i.e., the scaling is non-uniform for complex (non-convex) objects.

Figure 9A:
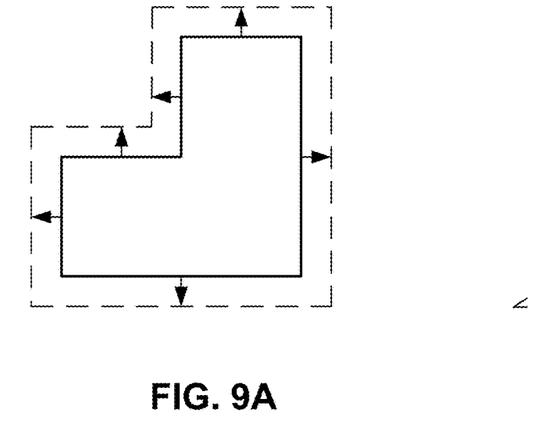
Figure 9B:
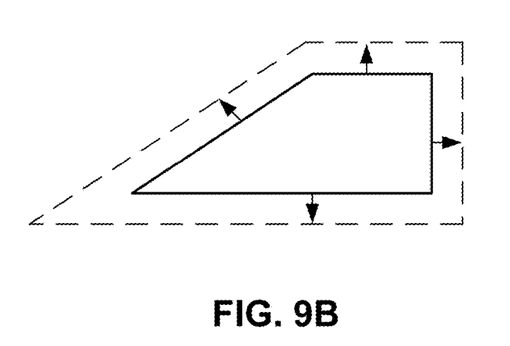
Figure 9C:
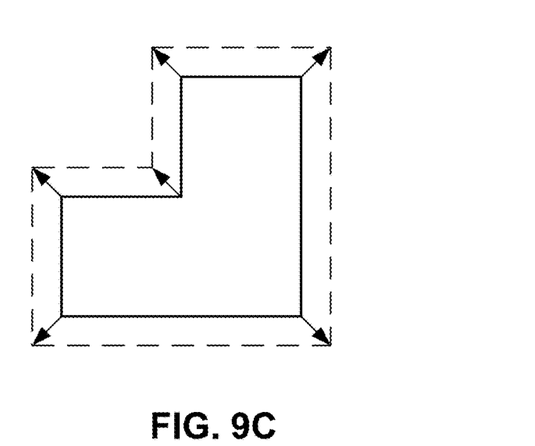
Figure 9D:
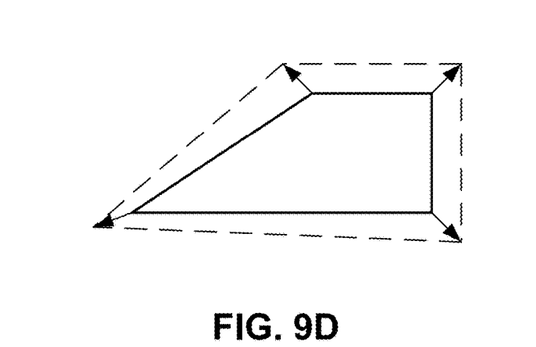

There are many ways to inflate or deflate and scale objects. Preferable ways are based on face normals or vertex normals. Although face normals give a more uniform result, a vertex normal technique is much simpler to implement and, for our needs, gives adequate results, and is the most preferred way to change the image of the model. FIGS. 9A and 9B show two differing shapes two dimensional shapes (solid lines) standing in for the three dimensional objects we are discussing. Face normals given by the arrows determine the inflated (dotted lines), while FIGS. 9C and 9D show the same shapes inflated by the vertex normals (scaled by square root of 2).

Figure 10A:
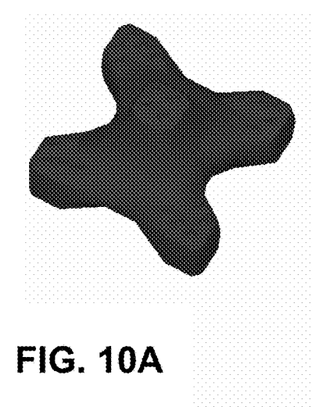
Figure 10B:
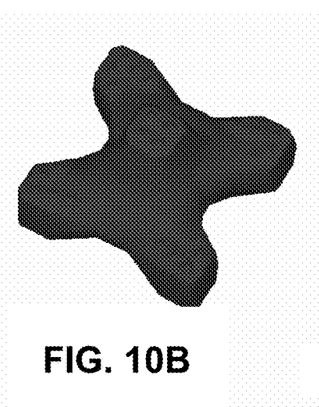
Figure 10C:
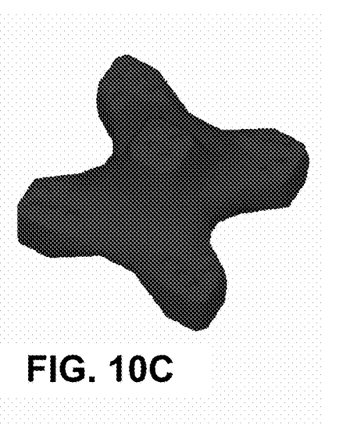
Figure 10D:
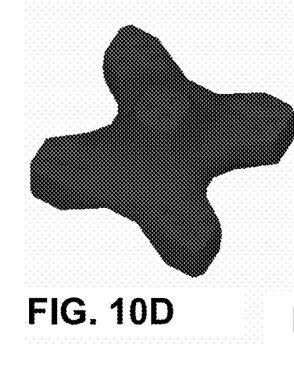
Figure 10E:
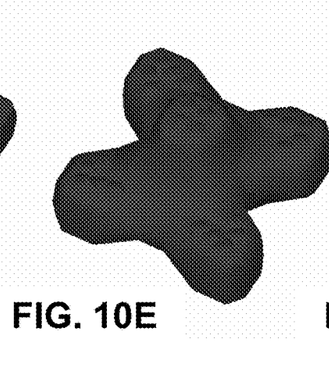
Figure 10F:
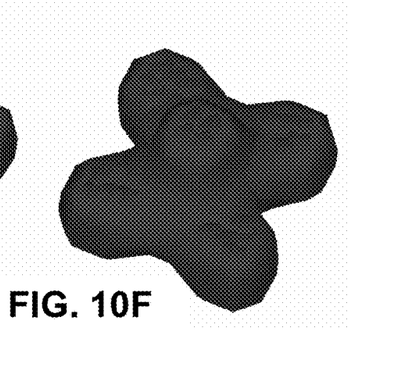

FIGS. 10A and 10D shows an image of an undistorted model Accropode. FIGS. 10B and 10C show images of the Accropode scaled by 5% and 10%. FIGS. 10E and 10F show images of the Accropode inflated along the vertex normals by 5% and 10%. Clearly, the inflated images more closely resemble the sonar images than do the scaled images.

The percentage inflation is of the model image is increased until the image of the Accropode is stable from ping to ping. As conditions (ie range) change, the percentage may be adjusted automatically or by hand.

Once the model Accropode image orientation and range have been determined, the sonar images may have the missing points drawn in. Or, the entire sonar image of the object may be replaced with an image of the model, and the image of the model can be drawn from any viewpoint at all. In particular, the model image may be used to guide the model with respect to either the sonar images or the model images of the background to a fit better than the resolution of sonar images.

Obviously, many modifications and variations of the present invention are possible in light of the above teachings. It is therefore to be understood that, within the scope of the appended claims, the invention may be practiced otherwise than as specifically described.

The invention claimed is:

1. A method of tracking a known object having non-convex properties, comprising:
constructing, from sonar data points returned from the known object having non-convex properties in response to a plurality of sonar pings, one or more three-dimensional (3D) sonar images representing the known object having non-convex properties, each of the one or more 3D sonar images comprising sonar data points returned in response to a respective one of the plurality of sonar pings;
constructing, from stored modeling data comprising predefined characteristics of the known object having non-convex properties including a set of 3D coordinates detailing a surface of the known object having non-convex properties, a 3D model image representing the known object having non-convex properties, the 3D model image comprising a plurality of data points;
for each 3D sonar image, fitting the data points of the 3D model image over the sonar data points of the 3D sonar image by distorting the 3D model image based on a distortion of the 3D sonar image such that jitter arising from one or more image artifacts is reduced between each successive 3D sonar image of the one or more 3D sonar images, wherein distorting the 3D model image comprises performing an inflation or a deflation on the plurality of data points of the 3D model image relative to the 3D sonar image.

2. The method of claim 1, wherein distorting the 3D model image further comprises modifying the 3D model image to fit the 3D sonar image.

3. The method of claim 2, wherein distorting the 3D model image to fit the 3D sonar image further comprises distorting, based on the stored modeling data, the 3D model image to match the distortion of the 3D sonar image.

4. The method of claim 1, wherein the inflation or the deflation uses one of a face normal or vertex normal technique.

5. The method of claim 1, wherein distorting the 3D model image to fit the 3D sonar image further comprises performing an erosion of the 3D model image relative to the 3D sonar image.

6. The method of claim 1, wherein the sonar data includes a first set of points and wherein distorting the 3D model image further comprises:
creating a second set of points based on vertices and faces of the stored modeling data; and
aligning the first set of points with the second set of points using an image matching technique.

7. The method of claim 6, further comprising, reducing at least one of the first set of points and the second set of points prior to the alignment.

8. The method of claim 1, wherein the set of coordinates originate from machine drawings representing the known object having non-convex properties.

9. The method of claim 1, wherein the stored modeling data further comprises data representing symmetry information associated with the known object having non-convex properties.

10. The method of claim 9, wherein the symmetry information includes at least one of a reflection in a plan and a rotation about an axis associated with the known object having non-convex properties.

11. The method of claim 1, further comprising, drawing in missing points of the 3D sonar image based on the stored modeling data comprising predefined characteristics of the known object having non-convex properties.

12. The method of claim 1, further comprising, replacing the 3D sonar image with the 3D model image.

13. The method of claim 1, further comprising, reconstructing the 3D sonar image from another viewpoint based on the 3D model image.

14. A method of tracking a known object having non-convex properties, comprising:
constructing, from sonar data points returned from the known object having non-convex properties in response to a plurality of sonar pings, one or more three-dimensional (3D) sonar images representing the known object having non-convex properties, each of the one or more 3D sonar images comprising sonar data points returned in response to a respective one of the plurality of sonar pings;
constructing, from stored modeling data comprising predefined characteristics of the known object having non-convex properties including a set of 3D coordinates detailing a surface of the known object having non-convex properties, a 3D model image representing the known object having non-convex properties, the 3D model image comprising a plurality of data points;
for each 3D sonar image, distorting the 3D model image based on a distortion of the 3D sonar image to fit the data points of the 3D model image over the sonar data points of the 3D sonar image, wherein distorting the 3D model image comprises:

performing an inflation or a deflation on the plurality of data points of the 3D model image relative to the 3D sonar image along a face normal or a vertex normal of the 3D model image.

* * * * *